United States Patent
Telem (10) Patent No.: US 12,194,645 B1
(45) Date of Patent: Jan. 14, 2025

(54) INTEGRATED DRAWING SYSTEM AND METHOD

(71) Applicant: Foto Master LTD, Rehovot (IL)

(72) Inventor: Boaz Telem, Netanya (IL)

(73) Assignee: Foto Master LTD, Rehovot (IL)

(*) Notice: Subject to any disclaimer, the term of this patent is extended or adjusted under 35 U.S.C. 154(b) by 0 days.

(21) Appl. No.: 18/588,174

(22) Filed: Feb. 27, 2024

(51) Int. Cl.
| | |
|---|---|
| B25J 9/16 | (2006.01) |
| B25J 9/00 | (2006.01) |
| B25J 11/00 | (2006.01) |
| G06T 7/194 | (2017.01) |
| G06V 40/16 | (2022.01) |
| H04N 5/272 | (2006.01) |

(52) U.S. Cl.
CPC ........... B25J 9/1697 (2013.01); B25J 9/0096 (2013.01); B25J 9/1669 (2013.01); B25J 11/003 (2013.01); G06T 7/194 (2017.01); G06V 40/166 (2022.01); G06V 40/171 (2022.01); H04N 5/272 (2013.01)

(58) Field of Classification Search
CPC ...... B25J 9/1697; B25J 9/0096; B25J 9/1669; B25J 11/003; G06T 7/194; G06V 40/166; G06V 40/171; H04N 5/272
See application file for complete search history.

(56) References Cited

FOREIGN PATENT DOCUMENTS

CN 116922414 A * 10/2023

OTHER PUBLICATIONS

The Amazing Machine, Maillardet's Automaton, Franklin Institute, Philadelphia, PA, USA https://fi.edu/en/science-and-education/collection/maillardets-automaton?_gl=1%2Ayv3kxc%2A_gcl_au%2AMTQxNTg5MzkwOC4xNzA3MzA3Nzc4.
Masters Thesis: "Digital Media", Felix Fisgus and Joris Wegner, Summer 2021, University of the Arts Bremen Germany.
FeiGao, JingjieZhu ,ZeyuanYu1, PengLi1, and TaoWang, "Making Robots Draw A Vivid Portrait In Two Minutes", Jul. 21, 2020, Cornell University, USA.
Hansom Robotics 2019, Unit A, 25/F Block 2, Superluck Industrial Centre, 57 Sha Tsui Road, Tsuen Wan, Hong Kong, Nov. 2019, developed Sophia the Robot https://www.hansonrobotics.com/press_release/hanson-robotics-limited-announces-a-partnership-with-patrick-tresset-to-enable-sophia-the-robot-to-draw/.
"Joto the Drawing Robot", an Arduino-based gantry/board drawing system, introduced at the CES (Consumer Electronics Show) 2018 in Las Vegas Nevada, USA https://www.joto.rocks/.
Patrick Tresset, "Paul the Robot", https://patricktresset.com/new/about/.
Pindar Van Arman, "Cloudpainter", Painting Robots, Apr. 15, 2017 https://www.cloudpainter.com/.

* cited by examiner

*Primary Examiner* — Basil T. Jos
(74) *Attorney, Agent, or Firm* — The Roy Gross Law Firm, LLC; Roy Gross (57) ABSTRACT

An integrated portrait drawing system located at an event, the system comprising: a photo terminal stand system having a camera and a computer, the camera configured to capture a first photo of at least one user and the computer configured to pre-process the first photo to yield an initial image; an advanced image processor, configured to receive the initial image from the photo terminal stand system and to sequentially perform second pre-processing, AI processing, and face processing on the initial image and to yield at least one converted file; and at least one drawing bot configured to receive the at least one converted file from the advanced image processor and to draw a portrait drawing of the at least one user.

19 Claims, 7 Drawing Sheets

INTEGRATED DRAWING SYSTEM AND METHOD

FIELD OF INVENTION AND BACKGROUND

Embodiments of the current invention relate to the field of portrait drawing machines and specifically to an integrated drawing system and method thereof, including enhanced image processing and multi-device coordination.

In the specification and claims which follow, unless otherwise indicated, the term "user" is intended to mean a person whose portrait is drawn by a portrait drawing system. The term "portrait" is used interchangeably below with the terms "portrait drawing", "finished portrait", "finished drawing" and/or "finished caricature". The term "user" is used interchangeably below with the terms "guest" and/or "subject" with the user attending an event. In the specification and claims which follow, the term "event" is intended to mean a gathering of people, such as, but not limited to: parties; weddings; and other social gatherings-typically involving a plurality of attendees/guests.

Portrait drawing machines trace their roots from ingenious mechanical automatons of the nineteenth century to AI-driven drawing bots as presently known in the art. The evolution of such devices has transformed the art from rudimentary, pre-set mechanisms to dynamic, digitally-powered systems that deliver rapid and precise facial illustrations. One of the central objectives of portrait drawing systems is to quickly and accurately provide a portrait of a user.

Currently-available portrait drawing systems utilize methods of training a single model using numerous drawings created by artists. This traditional approach tends to be slow and inefficient, particularly when striving for high-quality results that accurately resemble the user and cater to his preferences.

Among the Prior Art are:

The "Draughtsman-Writer" was purportedly built by Henri Maillardet around the year 1800. Maillardet, a Swiss mechanician of the 18th century worked in London producing clocks and other mechanisms. The so-called automaton represented a fascinating example of the intersection of art and science—and was a mechanical instrument to produce drawings. The "Draughtsman-Writer" was obtained by the Franklin Institute, Philadelphia, PA USA in 1928, when it was received in shambles. The automaton was subsequently restored, reassembled, and repaired over the years. Decades of work placed "Draughtsman-Writer" in working order and a number of images, including text, were successfully produced by it. In 2007, the Maillardet automaton was placed on display as the centerpiece of a then-new exhibition at The Franklin Institute entitled *Amazing Machine.*

In a master thesis in Summer 2021 by Felix Fisgus and Joris Wegner, of the University of the Arts Bremen Germany, the authors describe a machine design with the following design requirements: A machine that draws portraits depicting the most important features of a user in a reasonable timeframe; compact construction to simplify handling and transport, but large enough to convey a certain presence and be an eyecatcher during events; a simple setup and use due to self-contained package, ideally possible without trained personnel; a robust construction to survive use by the general audience; a fascinating mechanism, drawing as event; and made from as many 3d-printed and off—the shelf parts as possible to allow for economical construction without specialized equipment.

FeiGao,JingjieZhu,ZeyuanYul,PengLil, and TaoWang, in an article published 21 Jul. 2020, Cornell University, describe a drawing robot, which can automatically transfer a facial picture to a vivid portrait, and then draw it on paper within two minutes averagely. At the heart of the system is a novel portrait synthesis algorithm based on deep learning. A self-consistency loss is employed, which makes the algorithm capable of generating continuous and smooth brush-strokes. A componental sparsity constraint is proposed to reduce the number of brush-strokes over insignificant areas. Also implemented is a local sketch synthesis algorithm, and several pre- and post-processing techniques to deal with the background and details. The portrait produced by the algorithm successfully captures individual characteristics by using a sparse set of continuous brush-strokes. Finally, the portrait is converted to a sequence of trajectories and reproduced by a 3-degree-of-freedom robotic arm.

Hansom Robotics 2019, Unit A, 25/F Block 2, Superluck Industrial Centre, 57 Sha Tsui Road, Tsuen Wan, Hong Kong, November 2019, developed Sophia the Robo, which uses her eye cameras to capture an image of the subject seen by Sophia. "Next", which is Sophia's Hanson AI software, processes the photo to find the right balance between dark and light, and remove the background around the face. Then, usinig Patrick Tresset's artistic algorithms, Sophia urns the photo into a sketch and translates that sketch into lines and curves in 3D space. Sophia then considers the paper, planning the mioion of her robotic arrn and hand using inverse kinematics and Roboiics Operating Systern (ROS) to perform the precise quick movements to draw the subject with a ballpoint pen on paper. It typically takes Sophia around 7 minutes to sketch someone's face, depending upon the complexity of features.

"Joto the Drawing Robot", an Arduino-based gantry/board drawing system, was introduced at the CES (Consumer Electronics Show) 2018 in Las Vegas Nevada, USA. Joto is a consumer-grade version of a drawing bot and is a product sold on-line at https://www.joto.rocks/. Joto is described as: "the first connected whiteboard that draws with a pen. Send drawings to your walls or turn your home into an ever-changing gallery. Joto takes requests, sketching everything from works of art to love notes, to-do lists to puzzles."

Patrick Tresset, a contemporary French artist working with representations of human experience using computational systems, AI, robotics, and traditional media, published his works from 2011 to 2019. In 2012, he published "Paul the Robot" at https://patricktresset.com/new/project/6-robots-named-paul-2012/, showcasing an integration of robotics and art.

In "Cloudpainter", Pindar Van Arman showcases his Painting Robots at https://www.cloudpainter.com/15 Apr. 2017, which use deep learning neural networks, AI, feedback loops and computational creativity to make as many independent aesthetic decisions as possible. CloudPainter's entries in the 2017 Robot Art Challenge are examples of a process that is believed to have hit on something interesting.

In addition to the prior art noted hereinabove, in present systems, there are significant challenges in reliably and in rapidly transferring files between devices, which is a critical aspect of creating a seamless user portrait experience. This issue is further compounded in event settings where speed, reliability, and smooth operation are paramount to deliver an enjoyable and memorable experience. Moreover, current prior art methods lack advanced features such as the ability to create caricatures and other operational functionalities that enhance the overall value and appeal of the portrait keepsake.

There is therefore a need for a system and method which address shortcomings of the prior art noted hereinabove, specifically including: reliable and in rapid transferring of files between devices; advanced features such as, but not limited to the ability to create caricatures and other operational functionalities to enhance the overall value and appeal of a portrait keepsake and an overall entertainment experience for event attendees/guests.

SUMMARY OF THE INVENTION

According to one aspect of the present invention, there is provided an integrated portrait drawing system located at an event, the system comprising: a photo terminal stand system having a camera and a computer, the camera configured to capture a first photo of at least one user and the computer configured to pre-process the first photo to yield an initial image; an advanced image processor, configured to receive the initial image from the photo terminal stand system and to sequentially perform second pre-processing, AI processing, and face processing on the initial image and to yield at least one converted file; and at least one drawing bot configured to receive the at least one converted file from the advanced image processor and to draw a portrait drawing of the at least one user. Preferably, the computer of the photo terminal stand system has a photo booth app preprocessing module configured to preprocess the first photo and includes: an artificial intelligence (AI) background removal; a depth background removal; and a saving of the initial image. Most preferably, a second preprocessing module of the advanced image processor is configured to operate on the initial image to perform: a facial detection; a zoom and crop; and a grayscale generation thereupon. Typically, the at least one drawing bot includes: a robotic arm and a paper holder, the robotic arm having a drawing pen and a robotic arm base. Most typically, the paper holder is defined by a robotic arm coupling base frame unit, which serves to mechanically couple a frame robotic arm base, a paper holder frame unit, and a connecting bridge, the connecting bridge unit serving to stably connect the robotic arm coupling base frame unit, and paper holder frame unit. Preferably, the structure of the paper holder frame unit serves to facilitate quick and easy replacement of the drawing paper, to allow the portrait drawing to be removed without disturbing a position of the drawing bot.

According to another aspect of the present invention, there is further provided a method of an integrated portrait drawing system having a photo terminal stand, an advanced image processor, and at least one drawing bot located at an event, the method comprising the steps of: using the photo terminal stand to capture a first photo of at least one user; preprocessing the first photo to form an initial image in the photo terminal stand; using multi-peer connectivity to transfer the initial image from the photo terminal stand to the advanced image processor; using the advanced image processor to sequentially perform a second pre-processing, an AI (artificial intelligence) processing, and a face processing of the initial image; performing file conversion on the processed initial image, using the advanced image processor, to yield at least one converted file which is interpretable by the at least one drawing bot; and transferring the at least one converted file from the advanced image processor to the at least one drawing bot, where the at least one drawing bot draws a respective user portrait on a drawing paper. Preferably, capturing a first photo of at least one user includes using a user facial positioning interface, which generates and overlays an animated silhouette overlay onto the displayed first photo, the silhouette overlay serving as a guide to position the user face to ensure optimal positioning for photo capture. Most preferably, preprocessing the first photo to form an initial image includes an AI (artificial intelligence) background removal, a depth background removal, and saving the initial image. Typically, performing the second pre-processing of the initial image includes an AI-enhanced facial detection employing a dual-model approach of an OpenCV Haar Cascade model for an initial facial region estimation and a ResNet-based neural network model to refine the initial facial region estimation to ensures capturing a full facial region, including nuanced features such as hair. Most typically, the second pre-processing further includes a zoom and crop and a grayscale generation image of the initial image.

Preferably, the AI (artificial intelligence) processing of the initial image includes an AI style transfer using VGG (Very Deep Convolutional) neural network (AdaIN) architecture, whereby the grayscale generation image is tuned to adjust line thicknesses to be optimal for drawing by the at least one drawing bot. Most preferably, the face processing of the initial image includes: a facial components redesign; a beard design; and an eyeglass design. Typically, the file conversion is performed on the processed initial image, and whereby the at least one converted file includes: vectorizing the initial image into an SVG format, which is then transitioned to G-code for drawing by the at least one drawing bot; and generating a PNG version for digital sharing purposes. Most typically, the file conversion additionally includes managing a photo queue, allowing a system operator to prioritize, sort, and monitor a drawing process, including timing analytics and drawing bot assignment tracking. Preferably, the at least one drawing bot includes: a robotic arm and a paper holder, the robotic arm having a drawing pen and a robotic arm base, the paper holder being defined by a robotic arm coupling base frame unit, serving to mechanically couple a frame robotic arm base, a paper holder frame unit, and a connecting bridge, the connecting bridge unit serving to stably connect the robotic arm coupling base frame unit, and paper holder frame unit. Most preferably, the paper holder frame unit, including a slot and a space, serves to facilitate quick and easy replacement of the drawing paper, thereby allowing the user portrait drawing to be removed without changing the position of the drawing bot. Typically, a queue management system interface is provided and serves to organize and prioritize drawing tasks for the drawing bot and to display an order of incoming drawing tasks. Most typically, a monitor display system, which includes an external monitor, provides a visual interface where at least one guest observes the progress of his portrait in real time and his finished portrait, the monitor display system serving additionally as a platform to display branded content and advertisements.

LIST OF DRAWINGS

The invention is described herein, by way of example only, with reference to the accompanying drawings, wherein.

DETAILED DESCRIPTION

Embodiments of the current invention relate to the field of portrait drawing machines and specifically to an integrated portrait drawing system and method thereof, including enhanced image processing and multi-device coordination.

Central to embodiments of the current invention is an enhancement of the guest experience at events-commencing with an engaging photo capturing process, transitioning to the intriguing "show" of a bot in action, and culminating with the delivery of a high-quality portrait keepsake. Embodiments of the system of the current invention ensure that event guests are not only entertained throughout the process but are also highly satisfied with the speed and quality of the final product they receive.

While embodiments of the current invention are described hereinbelow with regard to specific Apple®, Mac®, and iPad® software and hardware as known in the art—it is to be understood that similar operating systems, software, and respective hardware may be similarly assembled in an integrated portrait drawing system and to function in similar fashion.

Figure 1:
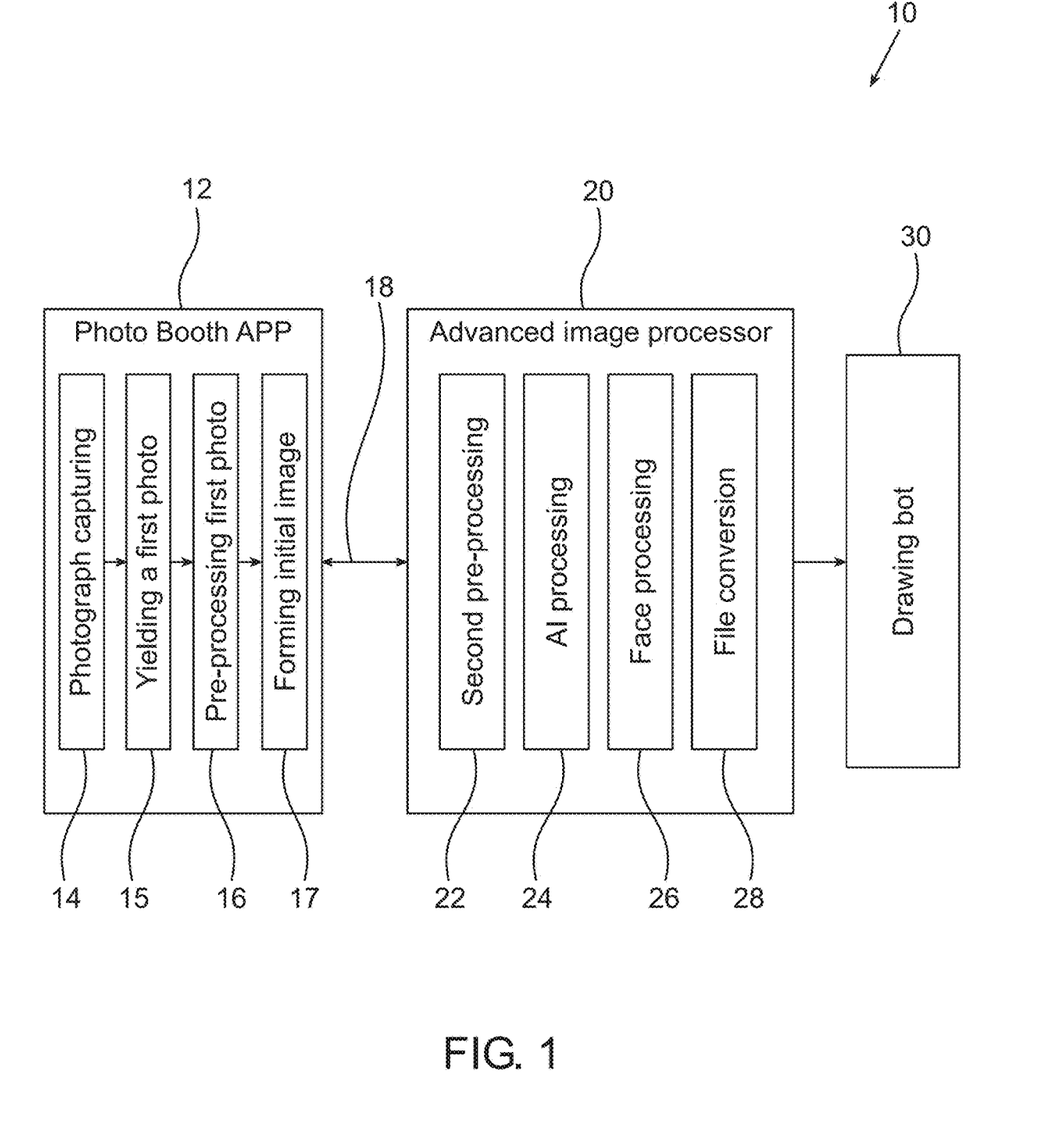
FIG. 1 is an overview flowchart/block diagram of an integrated portrait drawing system, in accordance with embodiments of the current invention.

Reference is currently made to FIG. 1, which is an overview flowchart/block diagram of an integrated portrait drawing system 10, in accordance with embodiments of the current invention. Operation begins with an iPadOS Photo Booth app 12 (also referred to hereinbelow collectively as "a photo terminal stand system", in which the iPadOS photo booth app operates), where a photograph of a user is captured 14, yielding a first photo 15 and the first photo is then pre-processed 16 to form an initial image 17. The initial image is transferred, using multi peer connectivity 18, to a MacOS software 20 (also referred to hereinbelow as an "advanced image processor", in which the MacOS software operates), where further image processing takes place, including: a second pre-processing 22, an AI (artificial intelligence) processing 24, a face processing 26, and a file conversion 28 take place. A final G-code, as known in the art, is then transferred from MacOS software 20 to at least one drawing bot 30 (also referred to hereinbelow as "DrawMeBot") which performs a final drawing (also referred to hereinbelow as "a portrait" and "a portrait drawing"). Embodiments of the integrated portrait drawing system may include a plurality of drawing bots, as described hereinbelow.

The current figure encapsulates a transition from digital image capture to physical rendering, highlighting the system's efficiency and technological synergy. The intimate image transfer from iOS Photo Booth app 12 to MacOS software 20 is facilitated by Apple's multi peer connectivity, ensuring compatibility and efficient data communication.

Figure 2A:
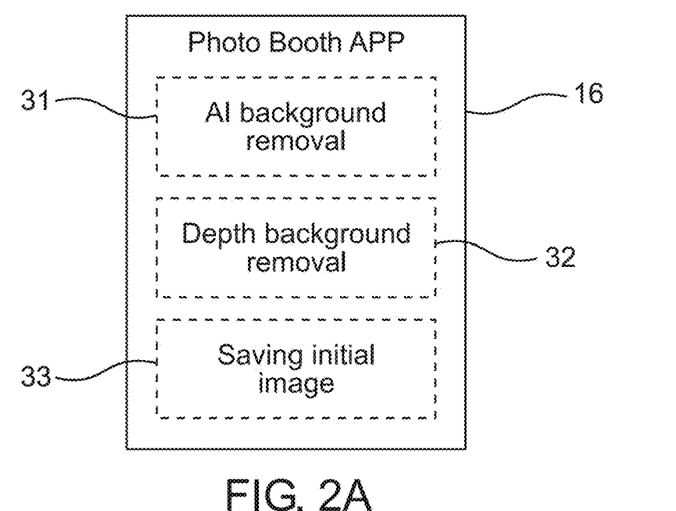
FIGS. 2A and 2B are, respectively, details of the iOS Photo Booth app preprocessing, and details of the MacOS software, the second pre-processing, the AI (artificial intelligence) processing, the face processing, and the file conversion, as shown and described hereinabove in FIG. 1, in accordance with embodiments of the current invention.
Figure 2B:
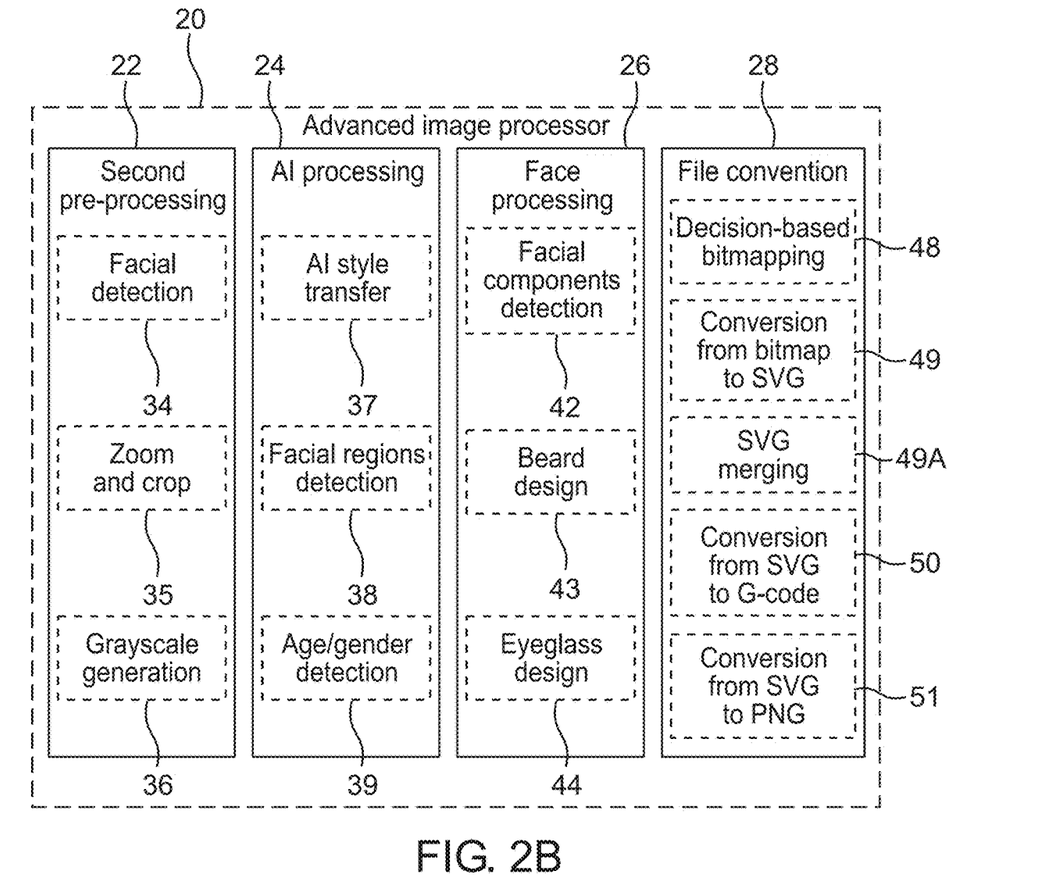

FIGS. 2A and 2B are, respectively, details of iOS Photo Booth app preprocessing 16, and details of MacOS software 20, second pre-processing 22, AI (artificial intelligence) processing 24, face processing 26, and file conversion 28, as shown and described hereinabove in FIG. 1, in accordance with embodiments of the current invention. Elements indicated by the same indicia in FIGS. 2A and 2B are generally identical in configuration, operation, and functionality as described hereinabove in FIG. 1.

Pre-processing 16, also called hereinbelow an "iOS Photo Booth app preprocessing module", includes the exemplary steps of: an AI background removal 31, a depth background removal 32, and a saving of an initial image 33, yielding initial image 17, as described hereinabove in FIG. 1.

Second pre-processing 22, also called hereinbelow a "second pre-processing module", includes the exemplary steps of: a facial detection 34, a zoom and crop 35, and a grayscale generation 36. Facial detection 34 includes AI-enhanced facial detection, which is accomplished through a sophisticated dual-model approach. A first model employs an OpenCV Haar Cascade model, as known in the art, for an initial facial region estimation. To refine the initial facial region estimation, a ResNet-based neural network model, as known in the art, serves as a second model, and is then applied. This dual-model approach ensures capturing a full facial region, including nuanced features such as, but not limited to hair, which are critical for achieving a high degree of accuracy in subsequent drawing stages.

AI processing 24 includes the exemplary steps of: an AI style transfer 37, a facial regions detection 38, and an age/gender detection 39. AI style transfer 37 includes a sophisticated AI style transfer, as described hereinbelow.

Utilizing a VGG (Very Deep Convolutional) neural network (AdaIN) architecture—as known in the art—the style of the greyscale image from step 34 is adapted to produce a resultant image which serves as the blueprint for the final drawing. This process is tuned to adjust line thickness to be optimal for pen drawing by a robotic arm of the DrawMeBot, as described further hereinbelow. Facial regions detection 38 is performed to accurately represent various hair textures and to integrate accessories such as glasses and beards to ensure a detailed and individualized portrait. Age/gender detection 39 serves to further refine the image by incorporating age and gender detection, leading to a personalized drawing style.

Face processing 26 includes the exemplary steps of: a facial components redesign 42, a beard design 43, and an eyeglass design 44. File conversion 28 includes the exemplary steps of: a decision-based bitmapping 48, a conversion from bitmap to SVG 49, a conversion from SVG to G-code 50, and a conversion from SVG to PNG 51.

Facial components redesign 42 is performed with attention to details, such as but not limited to, refining eyebrows and the jawline features. Other details such as eyeglasses and beards are accentuated in beard design 43, and in eyeglass design 44, respectively, for clarity and visual impact.

Included in file conversion 28, embodiments of the current invention optionally or additionally include additional SVG merging 49a of predefined logos, funny bodies, and/or heads, following conversion from bitmap to SVG 49. Examples of funny bodies and/or heads include, but are not limited to: a basketball player; a cook; and a weightlifter.

SVG merging 49a may additionally include random and/or gender-based detection (i.e., age/gender detection 39, as noted hereinabove) to include the funny bodies and to yield a richer caricature to be subsequently drawn by the DrawMeBot.

Following face processing 26, in file conversion 28, the processed initial image is vectorized into an SVG format, enabling a smooth transition to G-code, which is interpretable by the drawing bot. In parallel, a PNG version is generated for digital sharing purposes. The exemplary steps of file conversion described hereinabove in file conversion 28 yield converted files, collectively referred to hereinbelow as "at least one converted file".

The file conversion employed with the MacOS software allows for adjustable settings to tailor a drawing output, such as speed modulation, detail level, and a choice between realistic portrait and caricature. File conversion 28 additionally includes managing a photo queue, allowing the system operator to prioritize, sort, and monitor a drawing process, including timing analytics and drawing bot assignment tracking.

Following file conversion 28, the G-code is transmitted to the drawing bot, prompting the drawing process. The drawing process is observable by visitors, and provides an engaging experience and a resultant, unique keepsake.

Figure 3:
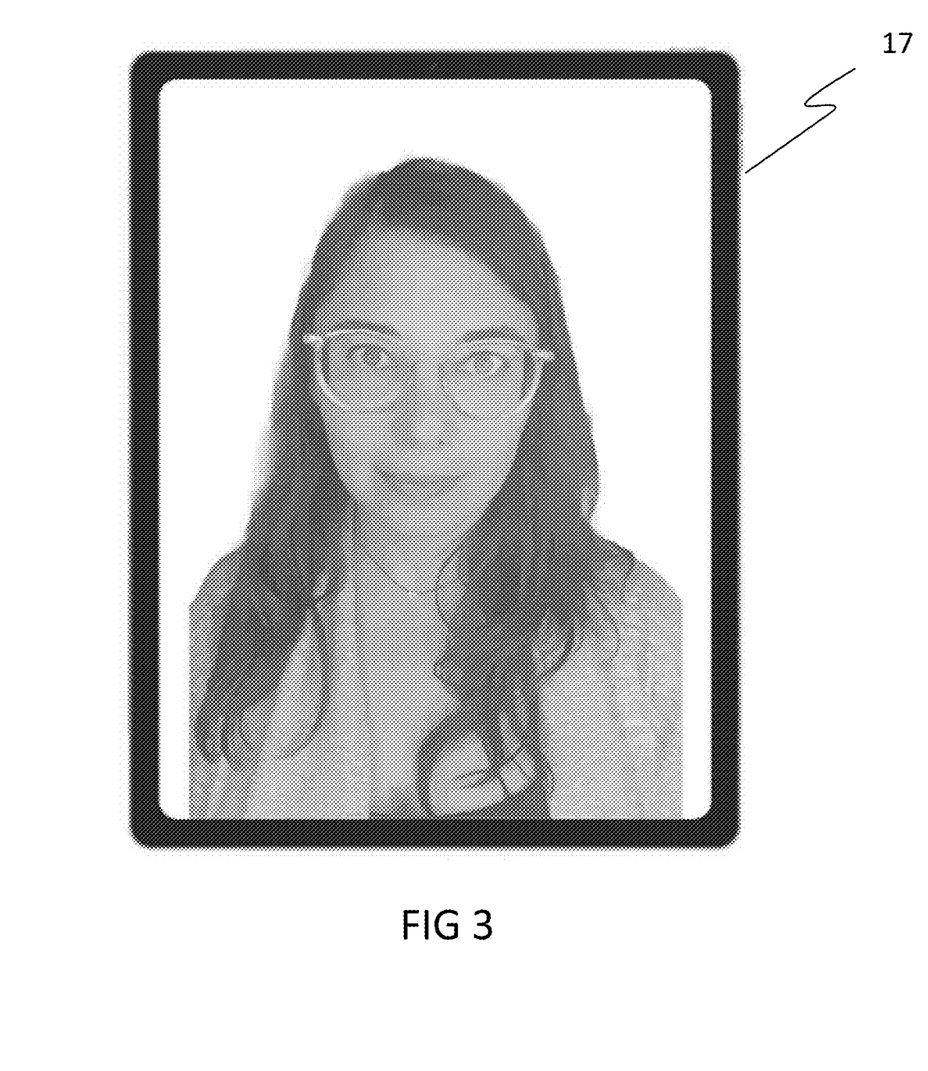
FIG. 3 is a pictorial resultant image representation of the initial image of the pre-processing steps described hereinabove in FIGS. 1 and 2A, in accordance with embodiments of the current invention.

Reference is currently made to FIG. 3, which is initial image 17 of the pre-processing steps described hereinabove in FIGS. 1 and 2A, in accordance with embodiments of the current invention. The photo capture and pre-processing steps of embodiments of the current invention are exemplified by specific capabilities of a FMBooth application by Foto Master Ltd. (the Applicant of the current invention) running on iPadOS, which includes a rich feature set of Foto Master's Photo Booth software, as described in U.S. Pat. No. 10,841,473.

In U.S. Pat. No. 10,841,473, a photo terminal stand system is provided having a case, a one-way mirror, a computer display for presenting a graphical presentation seen through the one-way mirror, a camera, a touch overlay frame, a computer configured to receive touch input from the touch overlay frame and responsively to activate the camera to record an image or a video sequence, a camera flash, and at least one of a reflector, a wheel bumper brake, and a service step ladder.

The FMBooth application leverages a custom workflow builder to enable a user to craft a personalized photo capture sequence having built-in or custom animations, random animation sequences, games, and other interactive features, available with the iPadOS.

Integration of the drawing bot involves two key features noted hereinabove, namely: the AI Background Removal and the Depth Background Removal. By applying these features, the FMBooth app serves to leverage the specialized camera array of the iPad to enhance depth perception and to eliminate extraneous figures behind the subject. The result is a clean portrait image, i.e. initial image 17, which is transmitted to the MacOS software for subsequent processing.

In some embodiments of the current invention, integrating the FMBooth application noted hereinabove, in addition to the image itself, additional user preferences and settings are recorded, such as the choice between a standard portrait or a caricature and preferences for drawing speed and detail. These data accompany the image transferred to the MacOS, where subsequent processing stages serve to tailor the final output/final image to user specifications.

Similar to file conversion 28 described in FIGS. 1 and 2B hereinabove on the MacOS, the initial image, subsequently vectorized into SVG format for the drawing bot, is also converted into a PNG file. The PNG file is then transferred back to the iPad using multi peer connectivity 18, as described in FIG. 1. The FMBooth app on the iPad facilitates sharing of the digital PNG version of the drawn portrait/final drawing. The user can send this digital keepsake to himself or to others using contact information, such as but not limited to SMS and an email address, which is collected during the initial interactive experience of the FMBooth app. In an embodiment of the current invention, queued sharing is triggered when the final PNG file is sent from the MacOS software back to the iPad, completing the user's engaging experience with a shareable digital memento.

Figure 4:
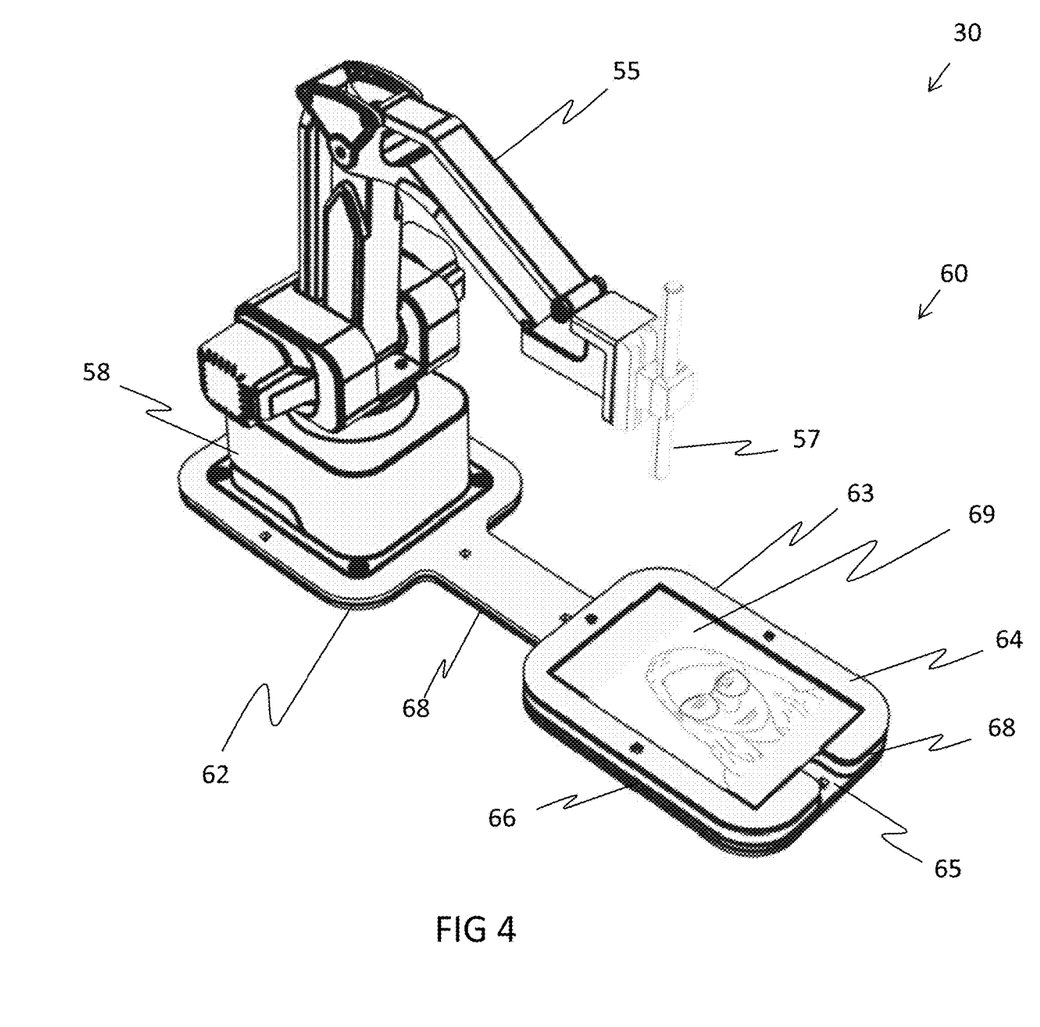
FIG. 4 is a pictorial representation of the drawing bot of FIG. 1, including a robotic arm and a paper holder, in accordance with embodiments of the current invention.

Reference is currently made to FIG. 4, which is a pictorial representation of drawing bot 30 of FIG. 1, including a robotic arm 55 and a paper holder 60, in accordance with embodiments of the current invention. Drawing bot 30 of the current figure is generally identical in configuration, operation, and functionality as described hereinabove in FIG. 1. Robotic arm 55 typically includes a drawing pen 57, as known in the art (and including a marker and other similar drawing devices), and a robotic arm base 58. In an exemplary embodiment of the current invention, robotic arm 55 is a Rotrics DexArm (operating using G-code instructions) of Rotrics, 168, Tongsha Rd., Nahshan District, Shenzhen, 518000 China.

Paper holder 60 has a generally flat configuration and is typically positioned stably on a flat and stable surface (not shown in the figure). Paper holder 60 is defined by three major structures, as shown in the figure, namely: a robotic arm coupling base frame unit 62, configured to mechanically couple a frame robotic arm base 58, a paper holder frame unit 63, and a connecting bridge 68, the connecting bridge unit serving to stably connect robotic arm coupling base frame unit 62 and paper holder frame unit 63. Paper holder frame unit 63 includes an upper frame piece 64, having a slot 65, as shown in the figure. Upper paper holder frame piece 64 is configured above and mechanically connected to lower paper holder piece 66, allowing a space 68 between the upper and lower paper holder pieces in which to snugly insert/slide drawing paper 69 (upon which the final drawing is drawn). In one embodiment of the current invention, robotic arm coupling base frame unit 62, connecting bridge 68, and paper holder frame unit 63 are formed in one piece.

Paper holder 60 serves to ensure drawing paper 69 is maintained in a substantially stable and stationary configuration relative to robotic arm 55. The paper holder thereby ensures that the drawing paper does not shift during the drawing process, to maintain precision and accuracy as the robotic arm draws the user portrait drawing. A stable mechanical connection between the bot and the drawing paper provided by paper holder 60 is critical to ensure the integrated portrait drawing system produces detailed and lifelike drawings, thereby enhancing the quality of the user final keepsake.

As noted hereinabove, the structure of paper holder frame unit 63, including slot 65 and space 68, serves to facilitate quick and easy replacement of the drawing paper, thereby allowing the user portrait drawing to be removed without disturbing the position of drawing bot 30. Additionally or optionally, drawing bot 30 can accommodate different sizes of drawing paper.

After completion of the final drawing, Robotic arm 55 returns to a home position and enters a pending state to await the next operation. Additionally or optionally, a replacement, new drawing paper is loaded into the paper holder and drawing bot 30 is set to "ready-to-draw" state using a numpad (not shown in the current figure). For example, when '1' is pressed on the numpad, the drawing bot has a status of "Robot Index 1" and is ready for the next job in queue. In this way, the drawing process of the integrated portrait drawing system is streamlined, allowing for commencement of a new drawing if a request is queued or ensuring prompt service for the next request. Also, as noted hereinabove, in an embodiment of the current invention, a plurality of drawing bots is employed to simultaneously draw a number of final portraits.

Figure 5:
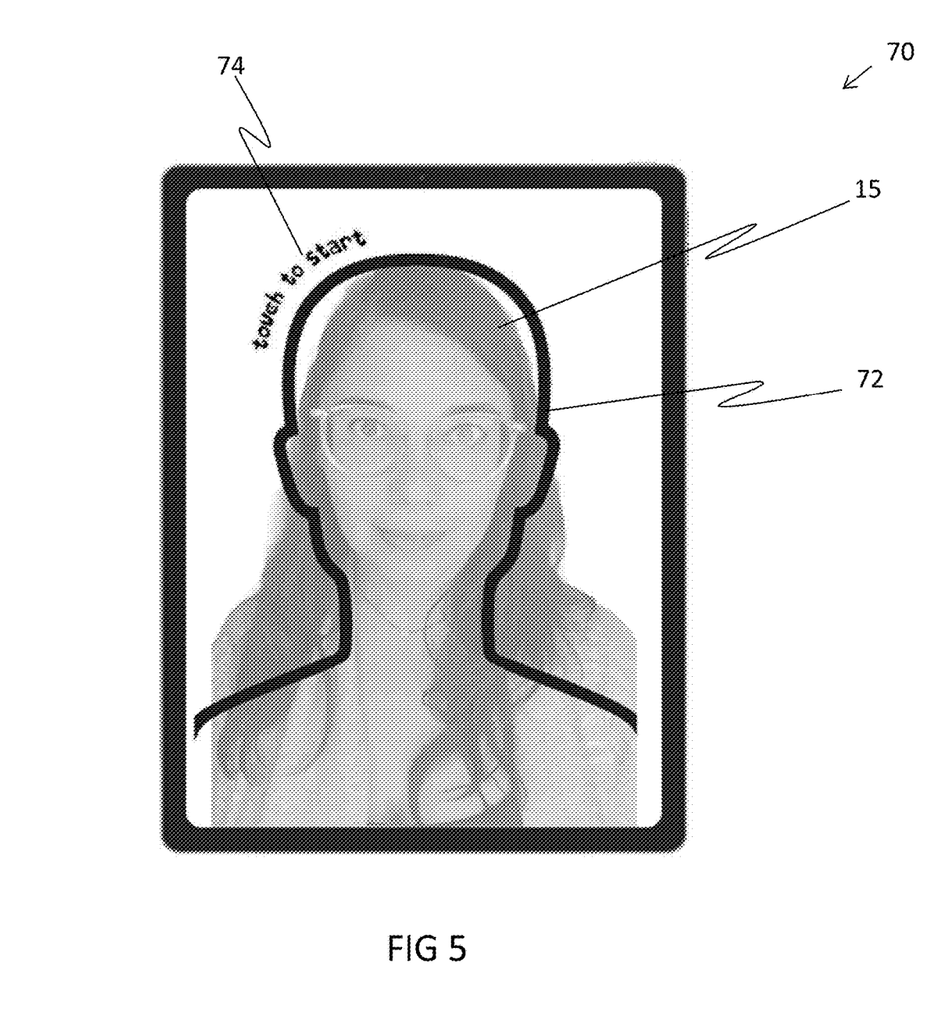
FIG. 5 is a representation of a user facial positioning interface of the iOS Photo Booth App, in accordance with embodiments of the current invention.

Reference is currently made to FIG. 5, which is a representation of a user facial positioning interface 70 of the iOS Photo Booth App, in accordance with embodiments of the current invention. User facial positioning interface 70 includes first photo 15 of the photo capture step (described hereinabove in FIGS. 1 and FIG. 3) with an animated silhouette overlay 72. The user facial positioning interface serves to enhance the photo capture experience, as described below.

Animated silhouette overlay 72 is generated and overlayed onto displayed first photo 15, as shown in the figure, matching an outline of a typical user's head and to thereby serve as a guide to position the user face, ensuring optimal positioning for photo capture. First photo 15 may be a "still" image or a live video display of an image. In an embodiment of the current invention, a user prompt 74 serves to prompt the user to "touch to start" and to position the silhouette overlay. The user facial positioning interface, accessible via the iPad, is highly customizable, and allows for the selection and sequencing of animations and features. The interface includes a function to display predefined and/or random animations, such as those described hereinabove in file conversion 28 of FIG. 2B.

Embodiments of the current invention further include the interface having a remote configuration through cloud services, enabling an operator to download and implement preset configurations from afar. This interface not only simplifies the user's experience but also ensures consistency in the quality of captured images, which is crucial for subsequent processing stages.

Figure 6:
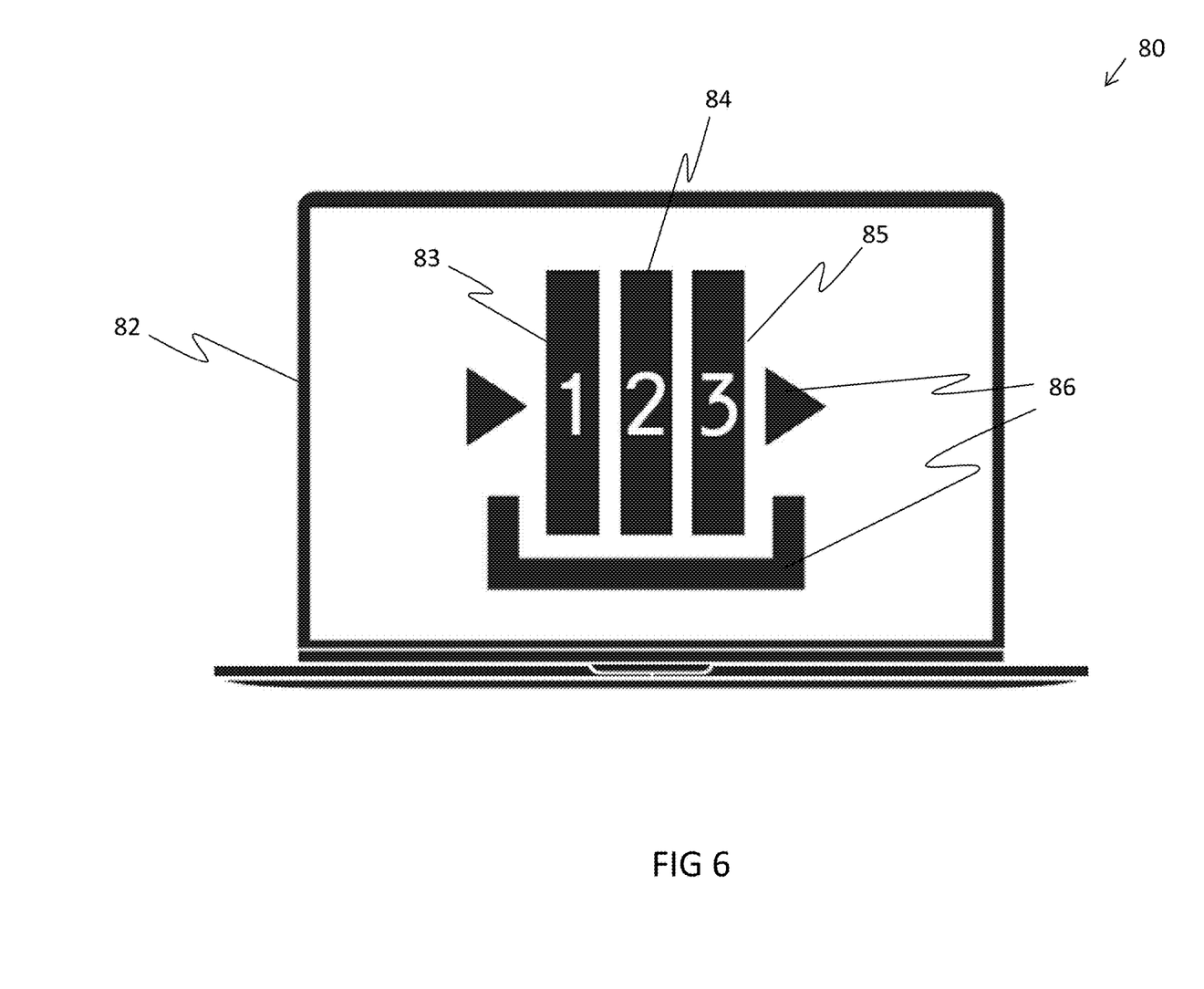
FIG. 6 is graphical representation of a Queue Management System interface on a MacOS display, in accordance with embodiments of the current invention.

Reference is currently made to FIG. 6, which is graphical representation of a Queue Management System interface 80 on a MacOS display 82, in accordance with embodiments of the current invention. Queue Management System interface 80 serves to organize and prioritize drawing tasks for the drawing bot shown in FIGS. 1 and 4 and described hereinabove. A default operation of the Queue Management System is on a first-come, first-served basis, with an intuitive user interface allowing for real-time adjustments and a streamlined management process, as described below.

Drawing tasks may include, but are not limited to: manually sequencing portrait drawing requests; adjusting drawing request queue order; initiating drawing processes; and managing a drawing workflow efficiently. The Queue Management System interface shown in the current figure includes three exemplary numbered slots 83, 84, 85 (indicated as '1', '2', and '3' in the figure), which indicate an order of incoming drawing tasks. Additionally, visual cues 86 are included in Queue Management System interface 80 to guide the operator through a process of managing the queue.

Advantages of Queue Management System interface include: ensuring a smooth operation by providing control over the drawing sequence/queue, accommodating urgent drawing requests, minimizing drawing bot idle time; offering valuable insights such as live tracking of which bot is working on a specific photo, estimated and actual drawing times, and a comprehensive log for monitoring system performance and history.

Figure 7:
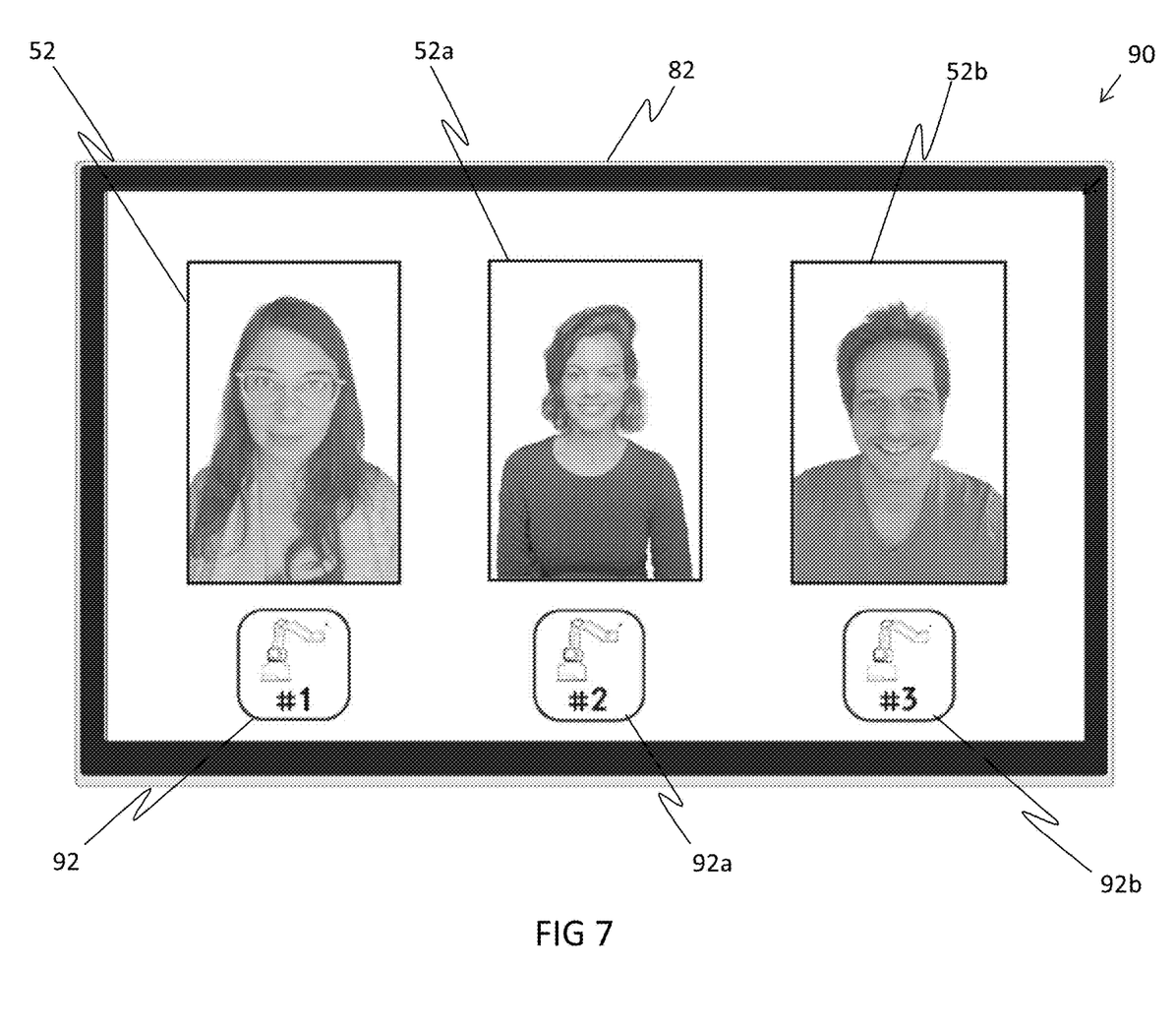
FIG. 7 is a pictorial representation of a monitor display system, in accordance with embodiments of the current invention.

Reference is currently made to FIG. 7, which is a pictorial representation of a monitor display system 90, in accordance with embodiments of the current invention. Monitor display system 90 serves to enhance the guest experience by providing a visual interface where one or more guests may observe the progress of their portrait in real time. The system includes an external monitor 82, as shown in FIG. 6 hereinabove.

Monitor 82 is connected to the MacOS software, which controls the content shown in the current figure, including real-time status information of respective guest's photos-being-processed 52, 52a, and 52b and corresponding, respective drawing bot's 92, 92a, and 92b.

It is noted that whereas three exemplary guest's photos-being-prepared and three respective exemplary drawing bot's are described above in FIGS. 6 and 7, embodiments of the current invention include the number of guests, drawings, and drawing bot's to vary from at least one to three or more.

In embodiments of the current invention, monitor 82 additionally serves as a platform to display branded content or advertisements, adding a marketing dimension to system 10. Upon completion of the portrait drawing by the respective drawing bot, the monitor displays the finished portrait or portrait caricature adding an element of surprise and delight for the guest. Displaying the portrait drawing on monitor 82 serves to engage guests and to elevate an overall entertainment value of the system.

It will be appreciated that the above descriptions are intended only to serve as examples, and that many other embodiments are possible within the scope of the present invention and as defined in the appended claims.

The invention claimed is:

1. An integrated portrait drawing system located at an event, the system comprising:
   a photo terminal stand system having a camera and a computer, the camera configured to capture a first photo of at least one user and the computer configured to pre-process the first photo to yield an initial image;
   an advanced image processor, configured to receive the initial image from the photo terminal stand system and to sequentially perform second pre-processing, AI processing, and face processing on the initial image and to yield at least one converted file; and
   at least one drawing bot configured to receive the at least one converted file from the advanced image processor and to draw a portrait drawing of the at least one user.

2. The integrated portrait drawing system according to claim 1, wherein the computer of the photo terminal stand system has a photo booth app preprocessing module configured to preprocess the first photo and includes: an artificial intelligence (AI) background removal; a depth background removal; and a saving of the initial image.

3. The integrated portrait drawing system according to claim 2, wherein a second preprocessing module of the advanced image processor is configured to operate on the initial image to perform: a facial detection; a zoom and crop; and a grayscale generation thereupon.

4. The integrated portrait drawing system according to claim 3, wherein the at least one drawing bot includes: a robotic arm and a paper holder, the robotic arm having a drawing pen and a robotic arm base.

5. The integrated portrait drawing system according to claim 4, wherein the paper holder is defined by a robotic arm coupling base frame unit, which serves to mechanically couple a frame robotic arm base, a paper holder frame unit, and a connecting bridge, the connecting bridge unit serving to stably connect the robotic arm coupling base frame unit, and paper holder frame unit.

6. The integrated portrait drawing system according to claim 5, wherein the structure of the paper holder frame unit serves to facilitate quick and easy replacement of the drawing paper, to allow the portrait drawing to be removed without disturbing a position of the drawing bot.

7. A method of an integrated portrait drawing system having a photo terminal stand, an advanced image processor, and at least one drawing bot located at an event, the method comprising the steps of:
    using the photo terminal stand to capture a first photo of at least one user;
    preprocessing the first photo to form an initial image in the photo terminal stand;
    using multi-peer connectivity to transfer the initial image from the photo terminal stand to the advanced image processor;
    using the advanced image processor to sequentially perform a second pre-processing, an AI (artificial intelligence) processing, and a face processing of the initial image;
    performing a file conversion on the processed initial image, using the advanced image processor, to yield at least one converted file which is interpretable by the at least one drawing bot; and
    transferring the at least one converted file from the advanced image processor to the at least one drawing bot, where the at least one drawing bot draws a respective user portrait on a drawing paper.

8. The method of the integrated portrait drawing system according to claim 7, whereby capturing a first photo of at least one user includes using a user facial positioning interface, which generates and overlays an animated silhouette overlay onto the displayed first photo, the silhouette overlay serving as a guide to position the user face to ensure optimal positioning for photo capture.

9. The method of the integrated portrait drawing system according to claim 7, whereby preprocessing the first photo to form an initial image includes an AI (artificial intelligence) background removal, a depth background removal, and saving the initial image.

10. The method of the integrated portrait drawing system according to claim 9, whereby performing the second pre-processing of the initial image includes an AI-enhanced facial detection employing a dual-model approach of an OpenCV Haar Cascade model for an initial facial region estimation and a ResNet-based neural network model to refine the initial facial region estimation to ensures capturing a full facial region, including nuanced features such as hair.

11. The method of the integrated portrait drawing system according to claim 10, whereby the second pre-processing further includes a zoom and crop and a grayscale generation image of the initial image.

12. The method of the integrated portrait drawing system according to claim 11, whereby the AI (artificial intelligence) processing of the initial image includes an AI style transfer using VGG (Very Deep Convolutional) neural network (AdaIN) architecture, whereby the grayscale generation image is tuned to adjust line thicknesses to be optimal for drawing by the at least one drawing bot.

13. The method of the integrated portrait drawing system according to claim 12, whereby the face processing of the initial image includes: a facial components redesign; a beard design; and an eyeglass design.

14. The method of the integrated portrait drawing system according to claim 13, whereby the file conversion is performed on the processed initial image, and whereby the at least one converted file includes: vectorizing the initial image into an SVG format, which is then transitioned to G-code for drawing by the at least one drawing bot; and generating a PNG version for digital sharing purposes.

15. The method of the integrated portrait drawing system according to claim 14, whereby the file conversion additionally includes managing a photo queue, allowing a system operator to prioritize, sort, and monitor a drawing process, including timing analytics and drawing bot assignment tracking.

16. The method of the integrated portrait drawing system according to claim 15, whereby the at least one drawing bot includes: a robotic arm and a paper holder, the robotic arm having a drawing pen and a robotic arm base, the paper holder being defined by a robotic arm coupling base frame unit, serving to mechanically couple a frame robotic arm base, a paper holder frame unit, and a connecting bridge, the connecting bridge unit serving to stably connect the robotic arm coupling base frame unit, and paper holder frame unit.

17. The method of the integrated portrait drawing system according to claim 16 whereby the paper holder frame unit, including a slot and a space, serves to facilitate quick and easy replacement of the drawing paper, thereby allowing the user portrait drawing to be removed without changing the position of the drawing bot.

18. The method of the integrated portrait drawing system according to claim 15, whereby a queue management system interface is provided and serves to organize and prioritize drawing tasks for the drawing bot and to display an order of incoming drawing tasks.

19. The method of the integrated portrait drawing system according to claim 18, whereby a monitor display system, which includes an external monitor, provides a visual interface where at least one guest observes the progress of his portrait in real time and his finished portrait, the monitor display system serving additionally as a platform to display branded content and advertisements.

\* \* \* \* \*